(12) United States Patent
Mermoud et al.

(10) Patent No.: US 10,771,331 B2
(45) Date of Patent: Sep. 8, 2020

(54) CLOSED LOOP CONTROL FOR FIXING NETWORK CONFIGURATION ISSUES TO AID IN DEVICE CLASSIFICATION

(71) Applicant: Cisco Technology, Inc., San Jose, CA (US)

(72) Inventors: Grégory Mermoud, Veyras (CH); Pierre-André Savalle, Rueil-Malmaison (FR); Jean-Philippe Vasseur, Saint Martin D'uriage (FR); Kevin Gagnon, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 17 days.

(21) Appl. No.: 16/182,761

(22) Filed: Nov. 7, 2018

(65) Prior Publication Data
US 2020/0145288 A1    May 7, 2020

(51) Int. Cl.
*G06F 15/16* (2006.01)
*H04L 12/24* (2006.01)
(Continued)

(52) U.S. Cl.
CPC ...... *H04L 41/0816* (2013.01); *H04L 61/2015* (2013.01); *H04L 67/02* (2013.01); *H04L 67/12* (2013.01)

(58) Field of Classification Search
CPC . H04L 41/0816; H04L 61/2015; H04L 67/02; H04L 67/12
(Continued)

(56) References Cited

U.S. PATENT DOCUMENTS 7,027,396 B1 * 4/2006 Golan ................. H04L 12/4641
370/232
7,293,086 B1 * 11/2007 Duffield ................. H04L 43/00
709/224

(Continued)

OTHER PUBLICATIONS

Cai, et al., "A Singular Value Thresholding Algorithm for Matrix Completion", arXiv:0810.3286v1, Oct. 18, 2008., pp. 1-28, arXiv. org.

(Continued)

*Primary Examiner* — Melvin H Pollack
(74) *Attorney, Agent, or Firm* — Behmke Innovation Group LLC; Kenneth J. Heywood; Jonathon P. Western (57) ABSTRACT

In one embodiment, a device receives traffic telemetry data captured by a plurality of networks and used by device classification services in the networks to classify endpoints in the networks with device types. The device compares the telemetry data from a particular one of the networks to the telemetry data from the other networks to identify one or more traffic characteristics that are missing from the telemetry data for one or more endpoints of the particular network. The device identifies a networking entity in the particular network that is common to the one or more endpoints for which the one or more characteristics are missing. The device determines a configuration change for the networking entity by comparing a current configuration of the entity to those of one or more entities in the other networks. The device initiates implementation of the determined configuration change for the entity in the particular network.

20 Claims, 8 Drawing Sheets

(51) Int. Cl.
*H04L 29/12* (2006.01)
*H04L 29/08* (2006.01)

(58) Field of Classification Search
USPC .................................................. 709/221
See application file for complete search history.

(56) References Cited

U.S. PATENT DOCUMENTS

| | | | |
|---|---|---|---|
| 7,525,484 B2* | 4/2009 | Dupray | G01S 1/026 |
| | | | 342/450 |
| 7,681,235 B2* | 3/2010 | Chesla | G06F 21/552 |
| | | | 726/22 |
| 8,149,718 B2 | 4/2012 | Marilly et al. | |
| 8,503,440 B2* | 8/2013 | Szymanski | H04L 49/101 |
| | | | 370/386 |
| 8,755,991 B2* | 6/2014 | Wynter | G08G 1/0104 |
| | | | 340/995.13 |
| 8,769,516 B2 | 7/2014 | Dhoolia et al. | |
| 9,525,696 B2* | 12/2016 | Kapoor | H04L 63/1425 |
| 9,602,338 B2* | 3/2017 | Zhang | H04L 43/0858 |
| 9,698,994 B2 | 7/2017 | Pani | |
| 9,735,833 B2* | 8/2017 | Gross | H04B 3/52 |
| 9,824,058 B2* | 11/2017 | Barner | H04L 47/6205 |
| 9,936,422 B2* | 4/2018 | Ganu | H04W 28/10 |
| 9,973,943 B2* | 5/2018 | Lysejko | H01Q 1/02 |
| 10,073,753 B2* | 9/2018 | Boyapalle | G06F 11/3452 |
| 10,079,721 B2* | 9/2018 | Nair | H04L 41/0886 |
| 10,101,244 B2* | 10/2018 | Mankovskii | H04L 67/12 |
| 10,136,373 B2* | 11/2018 | Baudoin | H04Q 9/04 |
| 10,242,193 B1* | 3/2019 | Babun | G06F 21/57 |
| 10,275,545 B2* | 4/2019 | Yeager | G06F 30/20 |
| 10,503,580 B2* | 12/2019 | Musuvathi | G06F 11/079 |
| 10,540,605 B2* | 1/2020 | Mermoud | H04L 41/16 |
| 2011/0276203 A1* | 11/2011 | Hase | B61L 23/047 |
| | | | 701/19 |
| 2017/0135124 A1* | 5/2017 | Szymanski | H04W 52/265 |
| 2017/0302554 A1 | 10/2017 | Chandrasekaran et al. | |
| 2018/0183397 A1* | 6/2018 | Wu | H03F 1/02 |
| 2018/0270310 A1* | 9/2018 | Venkatesan | H04L 67/12 |
| 2018/0302306 A1* | 10/2018 | Carroll | H04L 41/16 |
| 2018/0310221 A1* | 10/2018 | Amini | H04L 1/18 |
| 2019/0319858 A1* | 10/2019 | Das | H04L 27/2637 |
| 2019/0324444 A1* | 10/2019 | Cella | G05B 19/4184 |
| 2019/0339688 A1* | 11/2019 | Cella | G06K 9/6263 |
| 2019/0385057 A1* | 12/2019 | Litichever | G06N 3/08 |
| 2020/0007650 A1* | 1/2020 | Shribman | H04L 67/2838 |

OTHER PUBLICATIONS

Candés, et al., "Exact Matrix Completion via Convex Optimization", Foundations of Computational Mathematics, 9:717, 2009, Springer-Verlag.

Hayes, et al., "A Closed-Loop State Estimation Tool for MV Network Monitoring and Operation", IEEE Transactions on Smart Grid, pp. 1-10, 2014, IEEE.

Salakhutdinov, et al., "Bayesian probabilistic matrix factorization using Markov chain Monte Carlo", ICML '08 Proceedings of the 25th international conference on Machine learning, Helsinki, Finland, Jul. 5-9, 2008, pp. 880-887, 2008, ACM.

Lear et al. "Manufacturer Usage Description Specification draft-ietf-opsawg-mud-20" Network Working Group; Apr. 9, 2018; pp. 1-58.

* cited by examiner

CLOSED LOOP CONTROL FOR FIXING NETWORK CONFIGURATION ISSUES TO AID IN DEVICE CLASSIFICATION

TECHNICAL FIELD

The present disclosure relates generally to computer networks, and, more particularly, to close loop control on fixing network configuration issues to improve classification.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular IoT device is known to the network. For example, the network may limit a particular type of sensor to only communicating with its supervisory. However, with the ever-increasing number and variety of IoT devices, it may also be the case that the device type is not initially known to the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device receives traffic telemetry data captured by a plurality of networks and used by device classification services in the networks to classify endpoints in the networks with device types. The device compares the traffic telemetry data from a particular one of the networks to the traffic telemetry data from the other networks to identify one or more traffic characteristics that are missing from the traffic telemetry data for one or more endpoints of the particular network. The device identifies a networking entity in the particular network that is common to the one or more endpoints for which the one or more traffic characteristics are missing. The device determines a configuration change for the networking entity by comparing a current configuration of the networking entity to those of one or more networking entities in the other networks. The device initiates implementation of the determined configuration change for the networking entity in the particular network.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
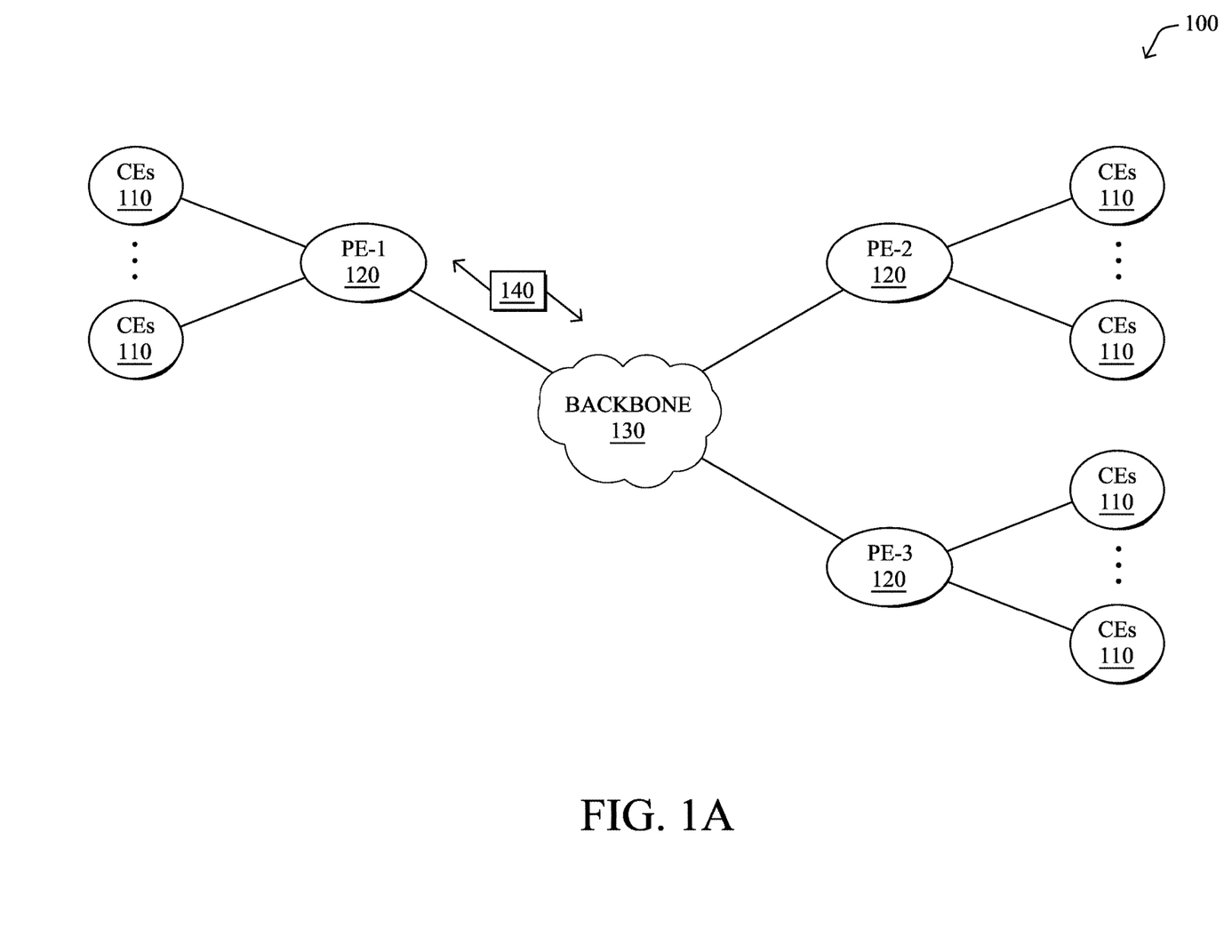
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
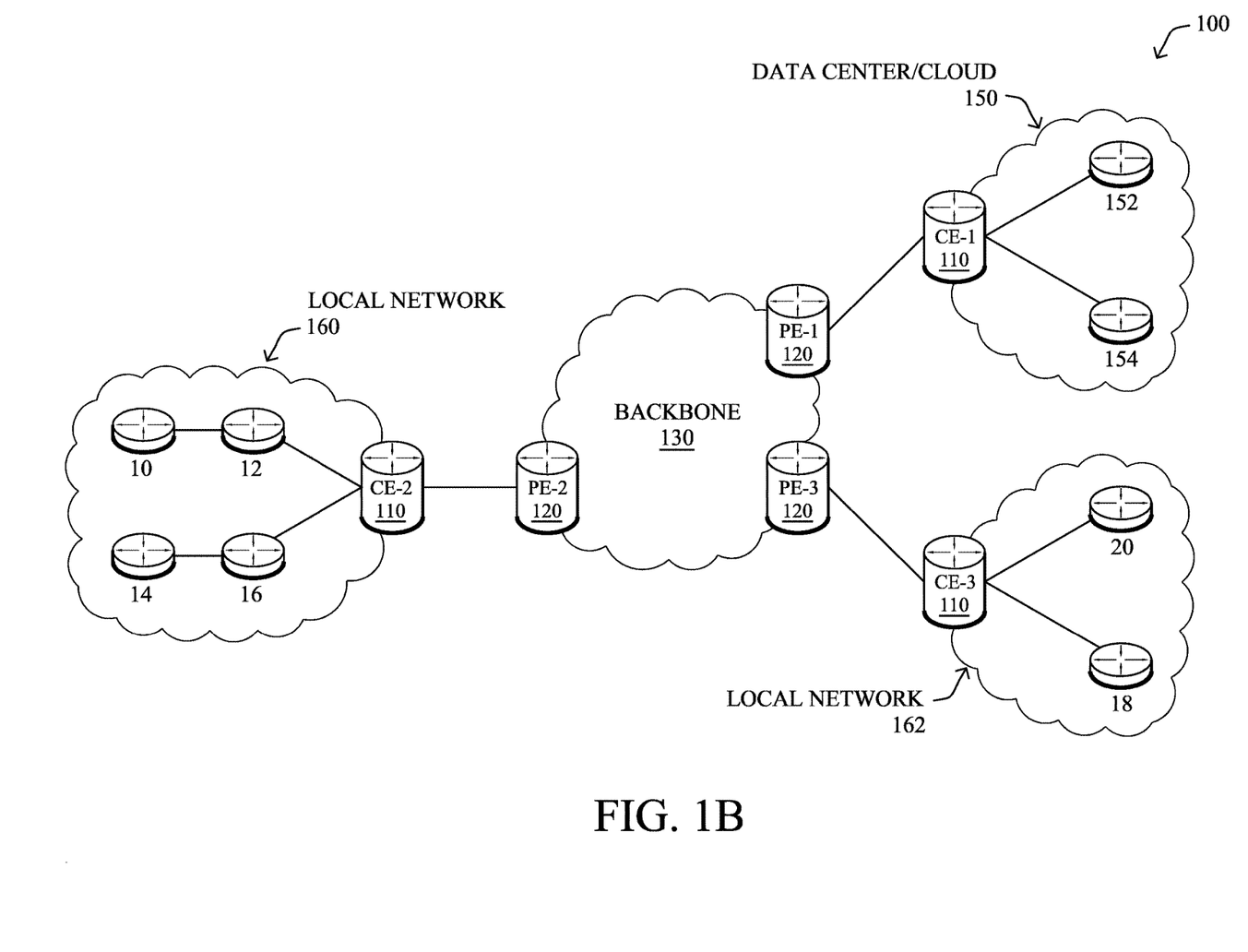

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
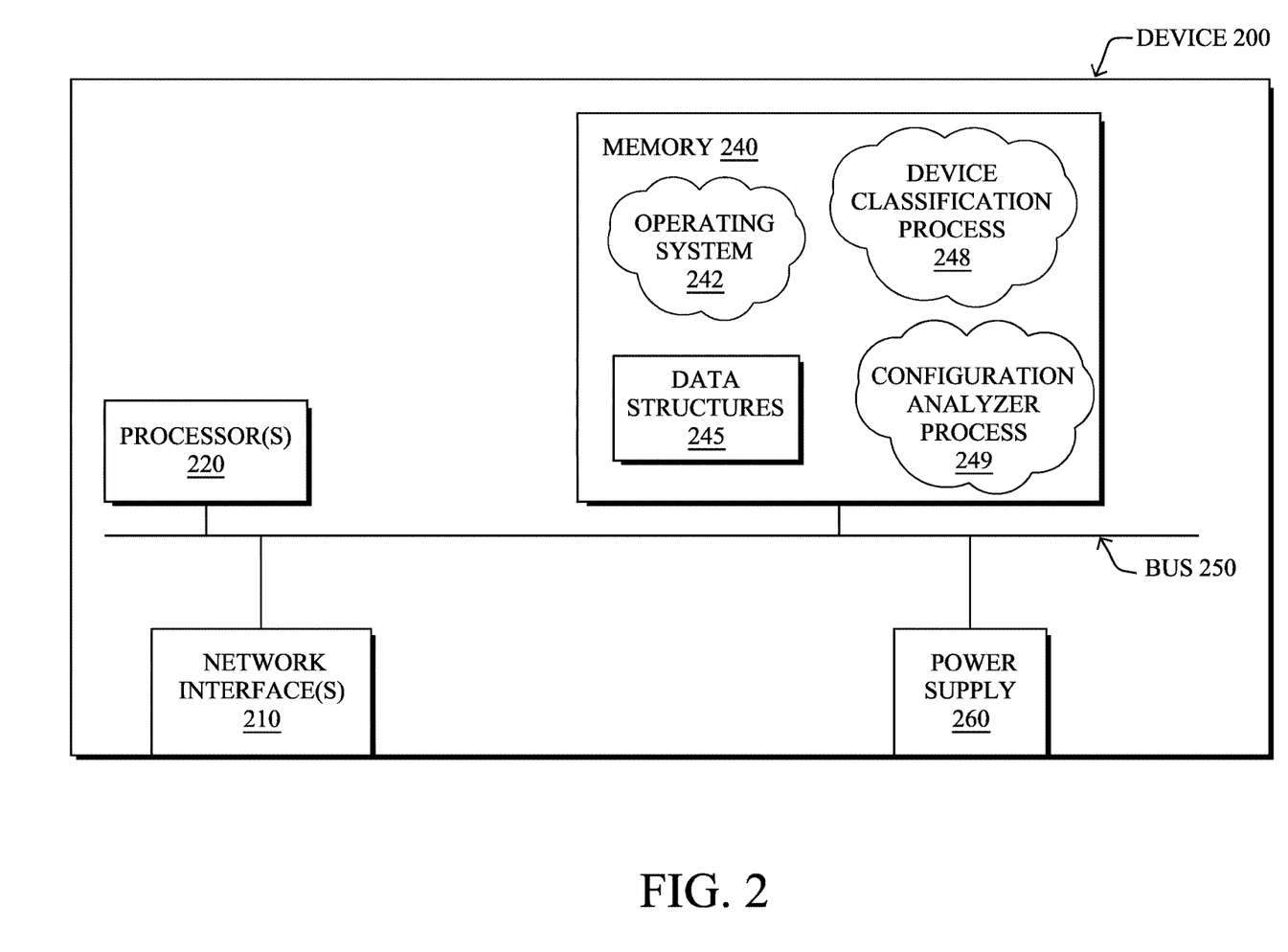
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248 and/or a configuration analyzer process 249.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
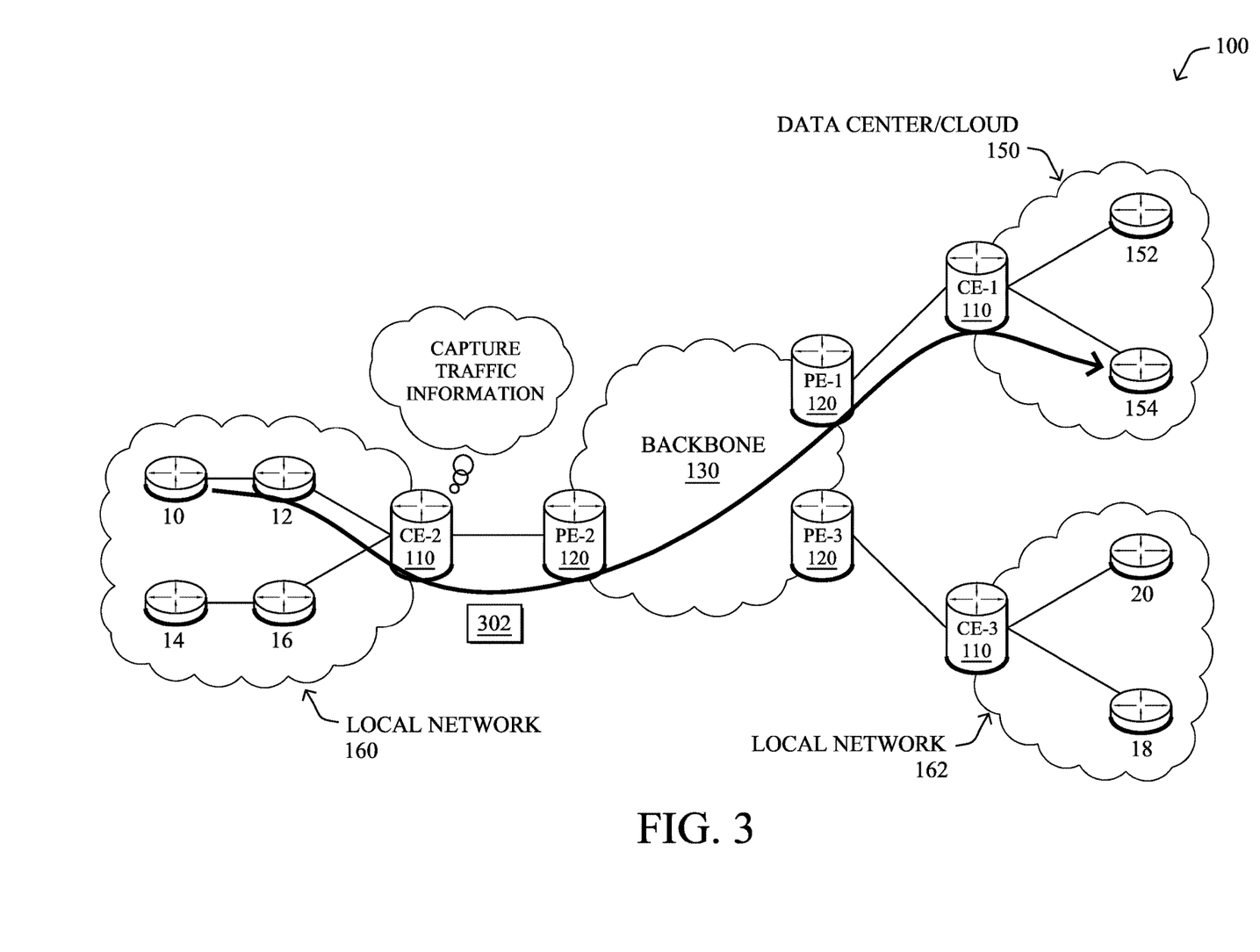
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example captured features may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

More specifically, most device classification systems (DCSs) today rely on simple rules and heuristics to classify devices. For instance, information extracted from DHCP or HTTP traffic can sometimes provide a pretty good clue as to the type of device. Notably, the DHCP vendor class identifier may directly indicate that the device is an Android phone, while the HTTP user agent may reveal more information about the operating system of the device. Similarly, the organizationally unique identifier (OUI) can be used to narrow down potential device types based on the corresponding manufacturer. Other characteristics that could help to classify a device by type are Link Layer Discovery Protocol (LLDP) information and manufacturer usage description (MUD) profiles. In further examples, device type classification can be achieved by using active and/or passive probing of devices, to assign a device type and corresponding host profile to a device. Notably, this probing may entail sending any or all of the following probes:

DHCP probes with helper addresses
SPAN probes, to get messages in INIT-REBOOT and SELECTING states, use of ARP cache for IP/MAC binding, etc.
Netflow probes
HTTP probes to obtain information such as the OS of the device, Web browser information, etc.
RADIUS probes
SNMP to retrieve MIB object or receives traps
DNS probes to get the Fully Qualified Domain Name (FQDN)
etc.

A DCS may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

In many networks, the number of devices that fall into the 'UNKNOWN' device type category has been found to be as high as 40%. In other words, up to 40% of the devices on a given network may not match any existing device profiling rules in use. This is expected to grow over time, illustrating the need for a more dynamic device profiling approach. Indeed, it is estimated that the number of endpoint devices will reach 3.6 billion by 2021.

Figure 4:
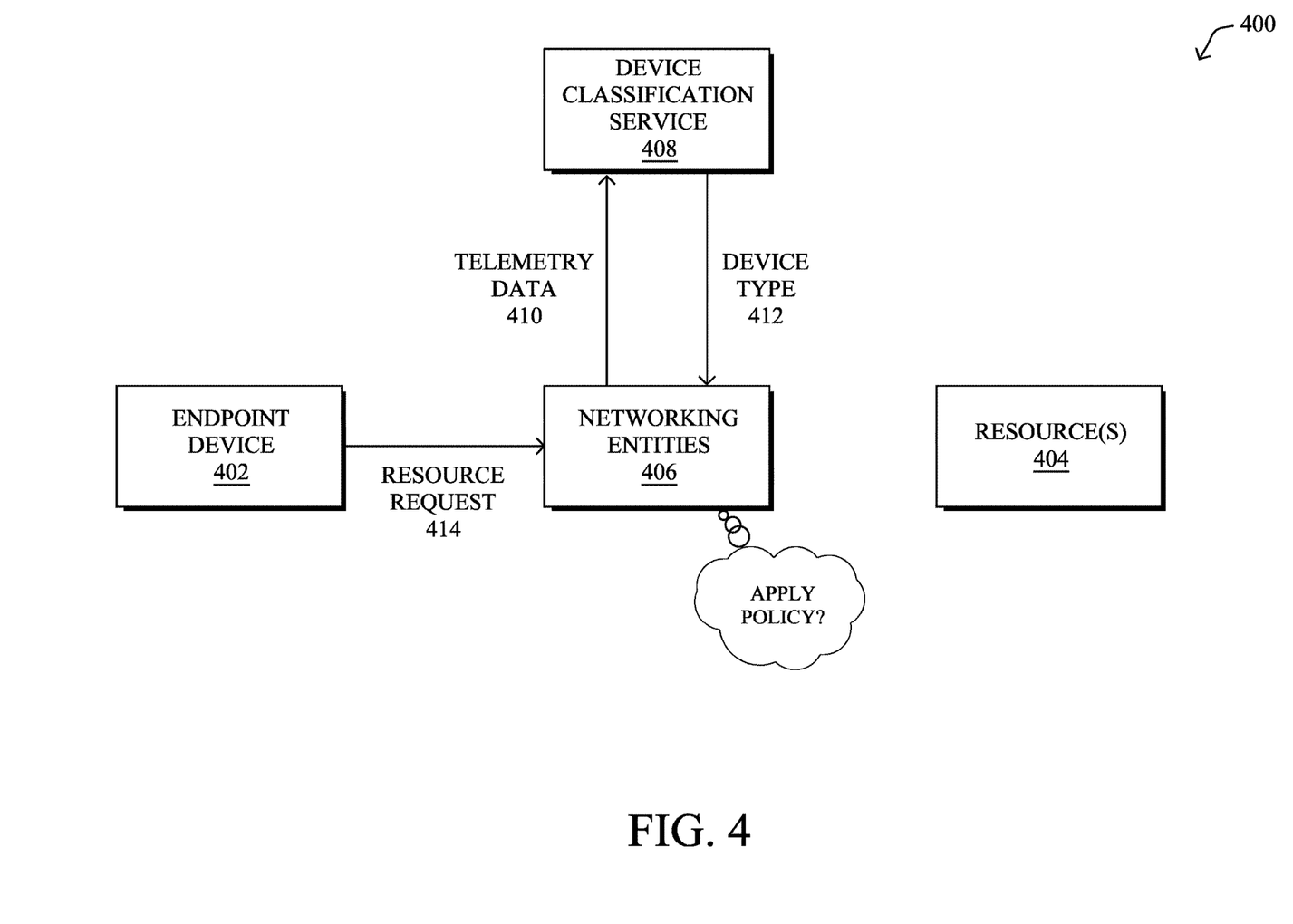
FIG. 4 illustrates an example of a device classification service in a network.

FIG. 4 illustrates an example of a device classification service 408 in a network, in various embodiments. As shown, network 400 may generally include an endpoint device 402 (e.g., a user device, a sensor, an actuator, etc.), any number of resources 404, and any number of networking entities 406 that are configured to provide connectivity between endpoint device 402 and resource(s) 404. For example, networking entities 406 may include access points, wireless LAN controllers (WLCs), switches, routers, security devices (e.g., firewalls, device identity services, etc.), and the like. Network resources 404 may include cloud-based services, specific servers or other endpoints, webpages, or any other resource with which endpoint device 402 could communicate.

Also as shown in FIG. 4 is device classification service 408 that may be hosted on one or more of networking entities 406 or be in communication therewith, either in the local network of networking entities 406 or at a remote location, such as being cloud-based. In general, device classification service 408 is configured to take as input telemetry data 410 captured by networking entity 406 regarding network traffic associated with endpoint device 402 and, based on the captured telemetry, identify the device type 412 of endpoint device 402 (e.g., by execution of device classification process 248, described previously). For example, device type 412 may indicate the operating system (e.g., iOS, Android, etc.), manufacturer (e.g., Apple, Samsung, etc.), make (e.g., iPhone, etc.), model (e.g., 5s, 6, 7, etc.), function (e.g., thermostat, temperature sensor, etc.), or any other information that can be used to categorize endpoint device 402. In various embodiments, device classification service 408 may use a machine learning-based classifier to classify telemetry data 410 and assign device type 412 to endpoint device 402.

Note that the classification of endpoint device 402 by service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether 402 is an iPhone 5s or an iPhone 6. Accordingly, in some embodiments, service 408 may also return the confidence values for the classification label(s) in device type 412 to networking entity 406.

The labeling of endpoint device 402 with a device type 412 by device classification service 408 may initiate enforcement of one or more network policies by networking entity 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking entities 406 may determine whether to allow or block resource request 414 from reaching its target resource 404, based on the policy associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking entities 406 to assign a higher priority to traffic from endpoint device 402.

As noted above, rules or heuristics can be relatively effective at identifying common devices such as laptops, mobile phones, tablets, and workstations, as long as the necessary data is available to the classification service. For instance, the User-Agent header sent by HTTP clients and/or DHCP fingerprint is often used to help classify a device. However, an improperly configured system may be unable to retrieve this data, thus causing misclassifications.

Closed Loop Control for Fixing Network Configuration Issues to Aid in Device Classification The techniques herein introduce a methodology to detect missing traffic characteristics that could be used as input data for device type classification systems. In some aspects, the missing traffic characteristics may be attributable to the misconfiguration of a networking entity in the network (e.g., a missing configuration, a bad configuration, etc.). In further aspects, the techniques herein allow for the identification and implementation of a configuration change to the misconfigured networking entity, so as to begin gathering the missing traffic characteristics for purposes of device type classification.

Specifically, according to one or more embodiments of the disclosure as described in detail below, a device receives traffic telemetry data captured by a plurality of networks and used by device classification services in the networks to classify endpoints in the networks with device types. The device compares the traffic telemetry data from a particular one of the networks to the traffic telemetry data from the other networks to identify one or more traffic characteristics that are missing from the traffic telemetry data for one or more endpoints of the particular network. The device identifies a networking entity in the particular network that is common to the one or more endpoints for which the one or more traffic characteristics are missing. The device determines a configuration change for the networking entity by comparing a current configuration of the networking entity to those of one or more networking entities in the other networks. The device initiates implementation of the determined configuration change for the networking entity in the particular network.

Illustratively, the techniques described herein may be performed by hardware, software, and/or firmware, such as in accordance with the configuration analyzer process 249, which may include computer executable instructions executed by the processor 220 (or independent processor of interfaces 210) to perform functions relating to the techniques described herein, e.g., in conjunction with device classification process 248.

Figure 5:
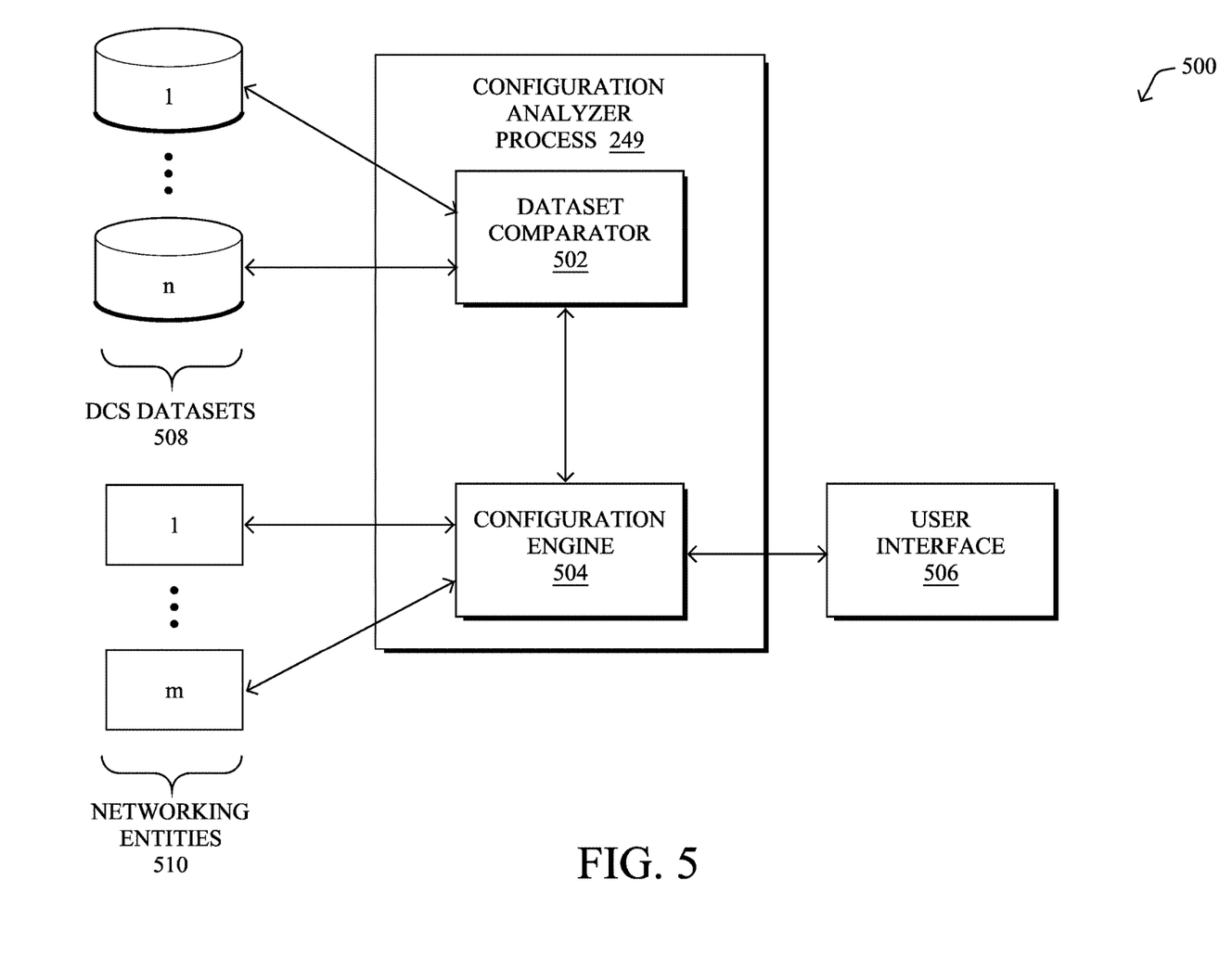
FIG. 5 illustrates an example architecture for fixing network configuration issues to aid in device classification.

Operationally, FIG. 5 illustrates an example architecture 500 for fixing network configuration issues to aid in device classification, according to various embodiments. As shown, configuration analyzer process 249 may generally include a dataset comparator 502 and/or a configuration engine 504. These components 502-504 may be implemented in a distributed manner or implemented on a single device. In addition, some or all of components 502-504 may be implemented as part of a monitored network (e.g., on networking entities 510) or part of a cloud-based service. The functionalities of the components of architecture 500 may also be combined, omitted, or implemented as part of other processes, as desired.

Configuration analyzer process 249 may communicate with any number of different networks, each of which may include its own device classification service (DCS). Accordingly, as shown, there may be a multi-network datalake of DCS datasets 508 available to configuration analyzer process 249 from any number of networks (e.g., a first through $n^{th}$ network). During execution, dataset comparator 502 may receive data from the DCS datasets 508, either on a push or pull basis. In general, the data received by dataset comparator 502 for a particular network may include the telemetry data gathered in that network regarding the various endpoints classified by the DCS of that network. For example, dataset comparator 502 may receive telemetry data for an endpoint in the network such as the MAC address, OUI, DHCP headers, DHCP fingerprints, DNS requests, HTTP headers, or the like. In addition, dataset comparator 502 may include an indication of the device type assigned to the endpoint by the DCS of the network. Further information that may be sent to dataset comparator 502 may also include the heuristics or other classification rules used by the local DCS to label the endpoint.

In various embodiments, dataset comparator 502 may compare the received data from DCS datasets 508 to identify whether one or more fields/traffic characteristics that are typically available in a correctly configured system are missing in a specific case. For example, assume that a certain traffic characteristic (e.g., an HTTP header field, such as user-agent, etc.) is missing from the traffic telemetry data for an endpoint in one of the networks, but is present in the telemetry data for similar endpoints in the other networks. The lack of such information may cause the DCS to misclassify the endpoint or, in some cases, oscillate between different device type classifications for the endpoint.

In one embodiment, dataset comparator 502 may use a matrix completion technique, to identify any missing traffic characteristics for one or more endpoints of a network. In particular, dataset comparator 502 may model any or all of the data received from DCS datasets 508 as a matrix M of dimension N×D, where D is the number of endpoints and N is the number of features/traffic characteristics. Now, assuming that a network is misconfigured, some of the columns in the formed matrix will be empty because of missing data. However, dataset comparator 502 may leverage a technique such as convex optimization, singular value decomposition, or the like, to recover the missing data, assuming that the matrix has a low rank (e.g., there is redundant information in the traffic features/characteristics). Matrix completion approaches make use of this redundancy to recover the missing entries in some columns by inferring them from other rows that share similarities with the rows to be completed, and for which these values are not missing.

In practice, features used in DCSs are often not real-valued but categorical. For instance, OUIs may be mapped to standardized names of chipset manufacturers, while DHCP information can take the form of a specific list of flags. Although some approaches to matrix completion may handle real-valued features, other approaches can also deal with categorical values. In particular, one-hot encoding can be used whereby a categorical feature with K possible values is transformed into K binary indicator features.

If some of the missing matrix entries can be recovered successfully, this is an indication that these characteristics are available in other networks, at least suggesting that they are missing from the reference network due to a misconfiguration in that network. One key challenge, however, is for dataset comparator 502 to also evaluate the success of the recovery. Indeed, traditional matrix completion approaches do not provide any estimate of their confidence and, in the absence of ground truth for the actual value of the missing fields, cannot really guarantee that the recovery has been successful. To that end, Bayesian method can be used, to quantify the confidence in the predictions.

In another embodiment, dataset comparator 502 may apply a binary mask when forming the matrix such that the presence, or lack thereof, of any given traffic characteristic/feature is indicated by a binary value in the matrix (e.g., '1' if the feature is present for that endpoint, '0' if not). In this case, the matrix completion by dataset comparator 502 can use a statistical approach to infer patterns of the form "when features X and Y are present, feature Z is usually available as well." Said differently, dataset comparator 502 may compare the entries for a given endpoint to a pattern of entries for other endpoints, to discern when there are missing characteristics/features. Doing so can also lead to better results over non-binary approaches. For example, when a categorical feature (e.g., DHCP fingerprinting information) has a high cardinality, the resulting matrix completion problem may be much simpler to solve using a binary masking approach. In other embodiments, other statistical techniques can be used as long as they can produce estimates of whether a given feature should have been present in a data point.

Figure 6A:
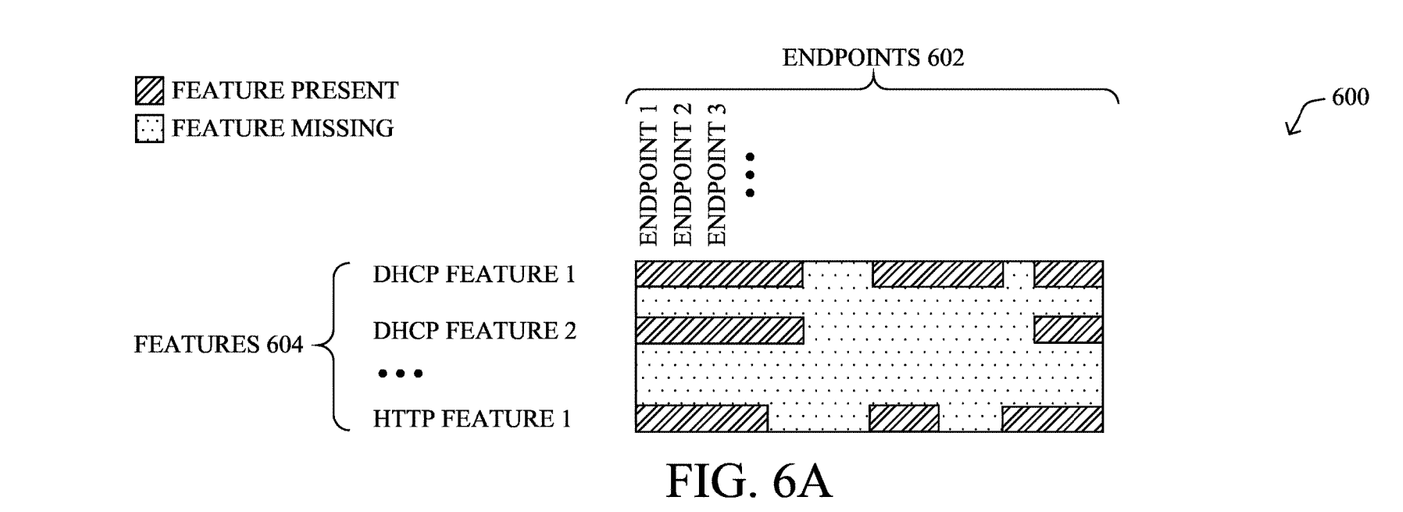
FIGS. 6A-6B illustrate examples of a comparison matrix of endpoint features.

FIGS. 6A-6B illustrate examples of a comparison matrix 600 of endpoint features that dataset comparator 502 may form and analyze, in some embodiments. As shown in FIG. 6A, assume that there exists a set of possible features 604 that are observed for a set of n-number of endpoints 602 and provided to dataset comparator 502. Using the above binary masking approach, dataset comparator 502 may represent the presence or absence of such a feature in the traffic telemetry data for the corresponding endpoint as a binary entry in matrix 600. For example, the first column of matrix 600 for "endpoint 1" may include binary values that indicate that "DHCP feature 1," "DHCP feature 2," and "HTTP feature 1" were present in the telemetry data for "endpoint 1." Similar entries may also exist for "endpoint 2," "endpoint 3," etc.

Figure 6B:
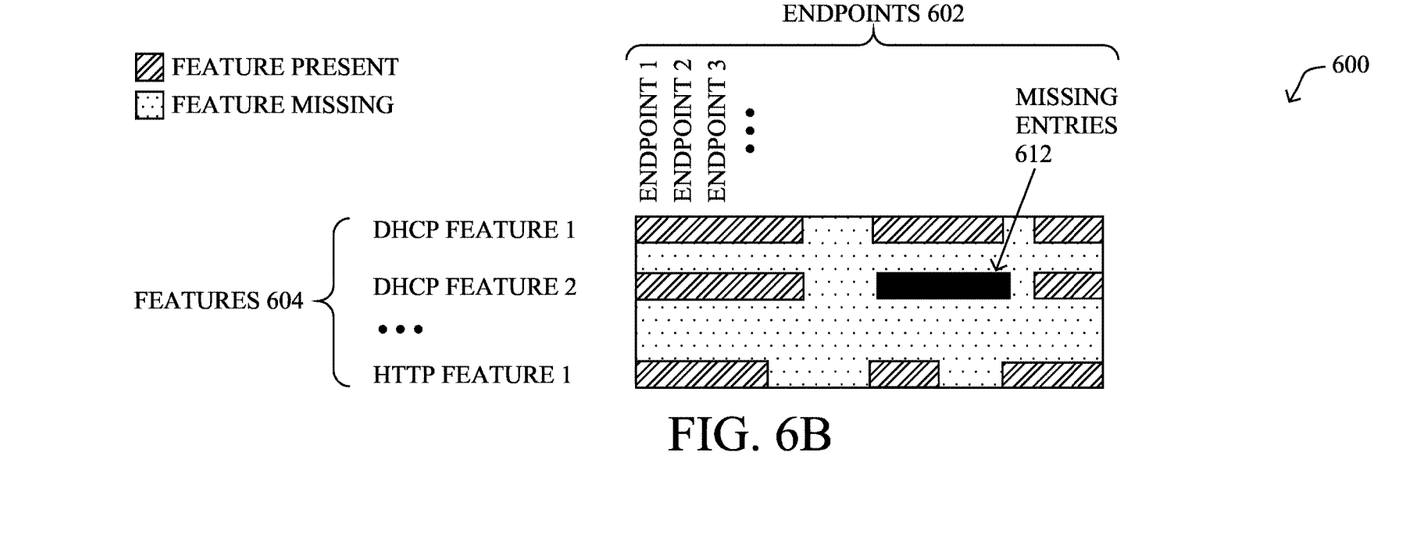

FIG. 6B illustrates matrix 600 after dataset comparator 502 has applied matrix completion to matrix 600. From this, dataset comparator 502 may determine that entries 612 shown are "missing." More specifically, dataset comparator 502 may determine that the endpoints associated with entries 612 exhibit similar characteristic/feature patterns as those of other endpoints (e.g., endpoint 1, endpoint 2, etc.), but without the presence of "DHCP feature 2." Thus, it is likely that DHCP feature 2 is not available for those endpoints due to a misconfiguration of one or more networking entities in the network of the endpoints.

Referring again to FIG. 5, dataset comparator 502 may perform a systemic search for missing features/characteristics across the entire dataset, in one embodiment. In further embodiments, dataset comparator 502 may perform such a search in response to the detection of classification oscillations for a particular endpoint. Indeed, if the endpoint is reclassified by its DCS, as indicated by the data in DCS datasets 508, this may indicate that a configuration issue exists in the network of the endpoint.

In various embodiments, architecture 500 may also include a configuration engine 504 that is responsible for determining which configuration parameters must be changed, in order to optimize the data collection for input to the DCSs. To this end, configuration engine 504 may collect configuration data for any number of networking entities 510 (e.g., a first through $m^{th}$ entity) in the networks associated with DCS datasets 508. In various cases, configuration engine 504 may receive the configuration information directly from networking entities 510 or, alternatively, from supervisory devices that oversee networking entities 510.

When dataset comparator 502 identifies a group of endpoints with missing features/characteristics, configuration engine 504 may search for similar endpoints in other networks, but for which the recovered fields were present. Note that such endpoints should always be present in the dataset analyzed by dataset comparator 502. Otherwise, dataset comparator 502 would not be able to recover these fields, in the first place. When found, configuration engine 504 may compare the configurations of the networks, to identify a configuration change for the subject networking device.

By way of example, assume that the telemetry data for the endpoints connected to a first networking entity 510 in a first network lacks a DHCP feature that is available in the telemetry data from other similar endpoints in other networks. In such a case, configuration engine 504 may identify other networking entities 510 in other networks and compare their configurations to that of the first networking entity 510. By doing so, configuration engine 504 may identify the configuration parameter(s) that are at the root cause of why the DHCP feature is not being collected in the first network.

In another embodiment, configuration engine 504 may build a mapping of configuration parameter to missing features/characteristics from the telemetry data. By accumulating such examples, configuration engine 504 can build a predictor of which fields will be missing given a set of configuration parameters. This predictor can then be sent to the local networks as a way to troubleshoot a network, even without pushing classifications and other information to the cloud.

Once configuration engine 504 has identified a configuration change for one of networking entities 510, it may initiate the configuration change in a number of ways. In some embodiments, configuration engine 504 may automatically push the configuration change to the affected networking entity 510 or to a supervisor of the entity. In turn, configuration engine 504 may seek feedback regarding the configuration change, such as via user interface 506 (e.g., to determine whether the change caused collateral damage). In further embodiments, configuration engine 504 may initiate the configuration change by first providing information about the change to user interface 506 as an improvement suggestion, thereby allowing the user to complete the configuration change.

In some embodiments, architecture 500 may employ a control loop mechanism configured to detect when a configuration change for a networking entity 510 led to improved classification. For example, in the case whereby classification of an endpoint oscillates, configuration engine 504 may monitor the corresponding data from DCS dataset 508, to ensure that the oscillations stop after re-configuration of the networking entity 510. At minimum, configuration engine 504 may determine whether the configuration change resulted in the presence of the missing feature(s)/characteristics(s). If the issue persists, or if the desired features are not present after the configuration change, configuration engine 504 may take any number of corrective measures such as computing another configuration change, logging and reporting on the feedback to user interface 506 for further inspection, etc.

Figure 7:
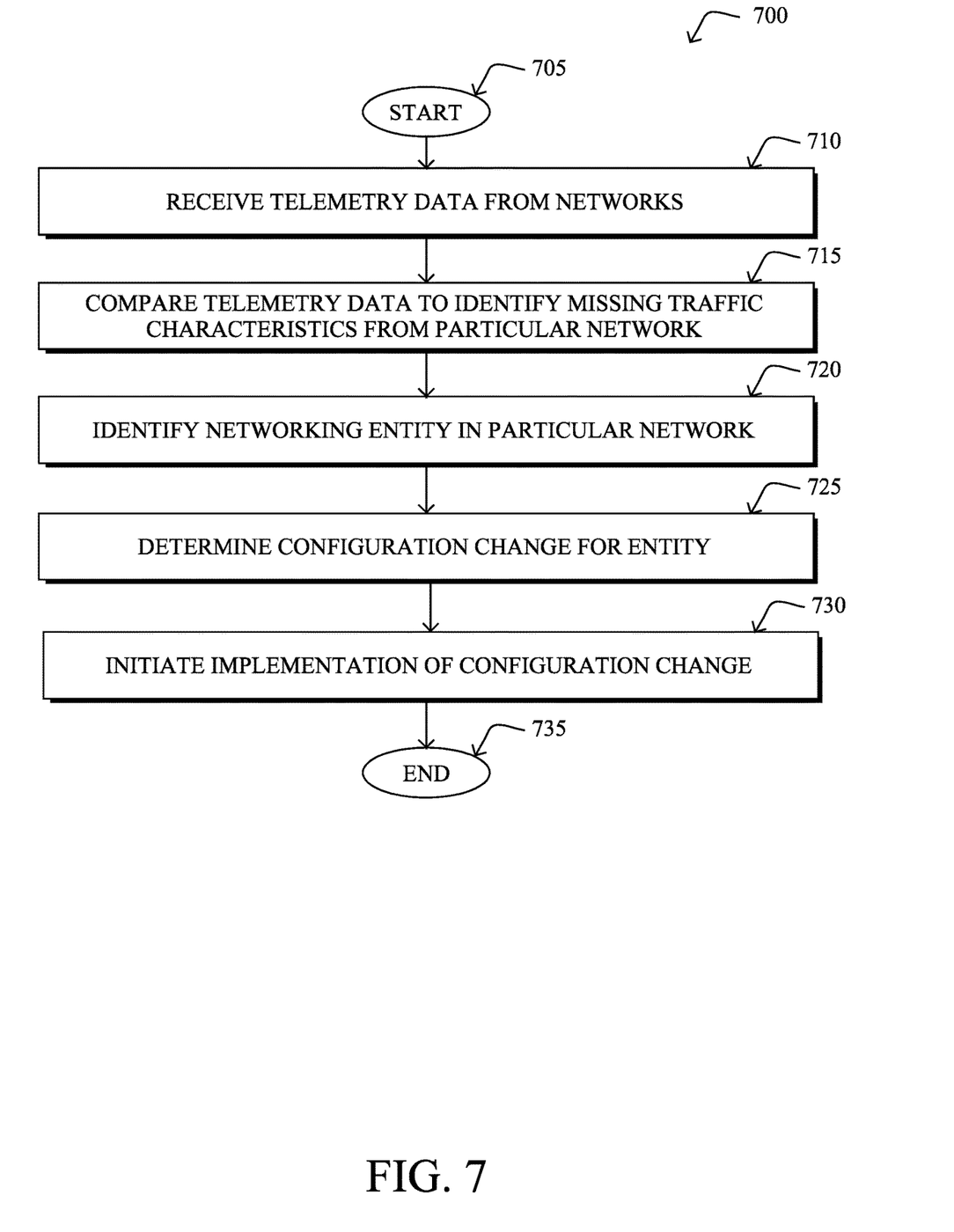
FIG. 7 illustrates an example simplified procedure for fixing configuration issues to aid in device classification.

FIG. 7 illustrates an example simplified procedure for fixing configuration issues to aid in device classification, in accordance with one or more embodiments described herein. For example, a non-generic, specifically configured device (e.g., device 200) may perform procedure 700 by executing stored instructions (e.g., process 249). The procedure 700 may start at step 705, and continues to step 710, where, as described in greater detail above, the device may receive traffic telemetry data captured by a plurality of networks and used by device classification services in the networks to classify endpoints in the networks with device types. Such traffic telemetry data may be any form of telemetry that can be captured from the traffic associated with an endpoint. For example, the traffic telemetry data may include HTTP header information, DHCP information, DNS information, address information, or the like.

At step 715, as detailed above, the device may compare the traffic telemetry data from a particular one of the networks to the traffic telemetry data from the other networks. By doing so, the device may identify one or more traffic characteristics that are missing from the traffic telemetry data for one or more endpoints of the particular network. In some embodiments, the device may perform the comparison by forming a matrix of traffic characteristics and their corresponding endpoints. In turn, the device may use matrix completion to add missing entries to the matrix, such as by matching the characteristics for one endpoint to a pattern of characteristics exhibited by other endpoints. In a further embodiment, the device may apply a binary mask to the traffic characteristics used to form the matrix. Such a binary mask may use binary values to indicate whether traffic of a given endpoint in the matrix exhibited a given traffic characteristic. By doing so, this reduces the computation needed to perform the matrix completion actions. Any entries in the matrix that are filled in through this approach can then be flagged as "missing" from the telemetry data.

At step 720, the device may identify a networking entity in the particular network that is common to the one or more endpoints for which the one or more traffic characteristics are missing, as described in greater detail above. For example, if a set of endpoints is attached to one or more wireless access points (APs) controlled by the same AP controller, and the device determines that a traffic characteristic is missing from the telemetry data for these endpoints, the device may determine that the AP controller is common to the endpoints and is likely misconfigured.

At step 725, as detailed above, the device may determine a configuration change for the networking entity by comparing a current configuration of the networking entity to those of one or more networking entities in the other networks. Notably, the device may look for differences in the configuration parameters between the networking device and the other networking devices and flag these differences as configuration changes for the networking device. In some cases, the device may also form a mapping between configuration parameters and the missing features/characteristics from the telemetry data. Such a mapping can be used in the local networks, for example, to troubleshoot the network without having to provide data up to the cloud.

At step 730, the device may initiate implementation of the determined configuration change for the networking entity in the particular network, as described in greater detail above. In some cases, the device may send the configuration change either to the affected networking entity or to a supervisor of the entity for implementation. In further cases, the device may send an indication of the configuration change to a user interface, allowing the user to review the change and finalize the implementation. Procedure 700 then ends at step 735.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for better classification of endpoints by a device classification service by identifying traffic characteristics/features that could be used for purposes of device classification, but are missing from the telemetry data of the endpoints. In turn, the techniques herein allow for the identification of a configuration change to a networking entity that will enable the collection of the missing features.

While there have been shown and described illustrative embodiments that provide for closed loop control for fixing network configuration issues to aid in device classification, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, such as DHCP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device, traffic telemetry data captured by a plurality of networks and used by device classification services in the networks to classify endpoints in the networks with device types;
forming, by the device, a matrix of traffic characteristics and associated endpoints from the traffic telemetry data;
determining, by the device, that one or more entries of the matrix are empty, the one or more empty entries of the matrix corresponding to one or more traffic characteristics that are missing from the traffic telemetry data for one or more endpoints of a particular network;
identifying, by the device, a networking entity in the particular network that is common to the one or more endpoints for which the one or more traffic characteristics are missing;
determining, by the device, a configuration change for the networking entity by comparing a current configuration of the networking entity to those of one or more networking entities in the other networks; and
initiating, by the device, implementation of the determined configuration change for the networking entity in the particular network.

2. The method as in claim 1, further comprising:
using matrix completion to add one or more entries to the matrix, wherein the added one or more entries correspond to the missing one or more traffic characteristics.

3. The method as in claim 2, wherein forming the matrix of traffic characteristics and associated endpoints from the traffic telemetry data comprises:
applying a binary mask to the traffic characteristics used to form the matrix, wherein the binary mask uses binary values to indicate whether traffic of a given endpoint in the matrix exhibited a given traffic characteristic.

4. The method as in claim 3, wherein using matrix completion to add one or more entries to the matrix comprises:
matching the traffic characteristics for the given endpoint to a pattern of traffic characteristics exhibited by other endpoints, wherein the pattern of traffic characteristics includes the missing one or more traffic characteristics.

5. The method as in claim 1, further comprising:
monitoring, by the device, whether the implemented configuration change to the networking entity prevented device type classifications for the one or more endpoints from oscillating.

6. The method as in claim 1, wherein initiating, by the device, implementation of the determined configuration change for the networking entity in the particular network comprises:
providing, by the device, an indication of the configuration change to a user interface.

7. The method as in claim 1, wherein the one or more missing traffic characteristics comprise a Hypertext Transfer Protocol (HTTP) feature, a Dynamic Host Configuration Protocol (DHCP) feature, an organizationally unique identifier (OUI), a Link Layer Discovery Protocol (LLDP) feature, or manufacturer usage description (MUD) information.

8. The method as in claim 1, wherein determining the configuration change for the networking entity by comparing the current configuration of the networking entity to those of one or more networking entities in the other networks comprises:
forming a mapping of one or more configuration parameters to the missing one or more traffic characteristics.

9. An apparatus, comprising:
one or more network interfaces to communicate with a network;
a processor coupled to the network interfaces and configured to execute one or more processes; and
a memory configured to store a process executable by the processor, the process when executed configured to:
receive traffic telemetry data captured by a plurality of networks and used by device classification services in the networks to classify endpoints in the networks with device types;
form a matrix of traffic characteristics and associated endpoints from the traffic telemetry data;
determine that one or more entries of the matrix are empty, the one or more empty entries of the matrix corresponding to one or more traffic characteristics that are missing from the traffic telemetry data for one or more endpoints of a particular network;
identify a networking entity in the particular network that is common to the one or more endpoints for which the one or more traffic characteristics are missing;
determine a configuration change for the networking entity by comparing a current configuration of the networking entity to those of one or more networking entities in the other networks; and
initiate implementation of the determined configuration change for the networking entity in the particular network.

10. The apparatus as in claim 9, wherein the process when executed is further configured to:
using matrix completion to add one or more entries to the matrix, wherein the added one or more entries correspond to the missing one or more traffic characteristics.

11. The apparatus as in claim 10, wherein the apparatus forms the matrix of traffic characteristics and associated endpoints from the traffic telemetry data by:
applying a binary mask to the traffic characteristics used to form the matrix, wherein the binary mask uses binary values to indicate whether traffic of a given endpoint in the matrix exhibited a given traffic characteristic.

12. The apparatus as in claim 11, wherein the apparatus uses matrix completion to add one or more entries to the matrix by:
matching the traffic characteristics for the given endpoint to a pattern of traffic characteristics exhibited by other endpoints, wherein the pattern of traffic characteristics includes the missing one or more traffic characteristics.

13. The apparatus as in claim 9, wherein the process when executed is further configured to:
monitor whether the implemented configuration change to the networking entity prevented device type classifications for the one or more endpoints from oscillating.

14. The apparatus as in claim 9, wherein the apparatus initiates implementation of the determined configuration change for the networking entity in the particular network by:
providing an indication of the configuration change to a user interface.

15. The apparatus as in claim 9, wherein the one or more missing traffic characteristics comprise a Hypertext Transfer Protocol (HTTP) feature, a Dynamic Host Configuration Protocol (DHCP) feature, an organizationally unique identifier (OUI), a Link Layer Discovery Protocol (LLDP) feature, or manufacturer usage description (MUD) information.

16. The apparatus as in claim 9 wherein the apparatus determines the configuration change for the networking entity by comparing the current configuration of the networking entity to those of one or more networking entities in the other networks by:
forming a mapping of one or more configuration parameters to the missing one or more traffic characteristics.

17. A tangible, non-transitory, computer-readable medium storing program instructions that cause a device to execute a process comprising:
receiving, at the device, traffic telemetry data captured by a plurality of networks and used by device classification services in the networks to classify endpoints in the networks with device types;
forming, by the device, a matrix of traffic characteristics and associated endpoints from the traffic telemetry data;
determining, by the device, that one or more entries of the matrix are empty, the one or more empty entries of the matrix corresponding to one or more traffic characteristics that are missing from the traffic telemetry data for one or more endpoints of a particular network;
identifying, by the device, a networking entity in the particular network that is common to the one or more endpoints for which the one or more traffic characteristics are missing;
determining, by the device, a configuration change for the networking entity by comparing a current configuration of the networking entity to those of one or more networking entities in the other networks; and
initiating, by the device, implementation of the determined configuration change for the networking entity in the particular network.

18. The computer-readable medium as in claim 17, wherein the process further comprises:
using matrix completion to add one or more entries to the matrix, wherein the added one or more entries correspond to the missing one or more traffic characteristics.

19. The computer-readable medium as in claim 18, wherein forming the matrix of traffic characteristics and associated endpoints from the traffic telemetry data comprises:
applying a binary mask to the traffic characteristics used to form the matrix, wherein the binary mask uses binary values to indicate whether traffic of a given endpoint in the matrix exhibited a given traffic characteristic.

20. The computer-readable medium as in claim 17, wherein the process further comprises:
monitoring, by the device, whether the implemented configuration change to the networking entity prevented device type classifications for the one or more endpoints from oscillating.

* * * * *